United States Patent
Nishida

(10) Patent No.: US 8,129,970 B2
(45) Date of Patent: Mar. 6, 2012

(54) SWITCHING REGULATOR WITH REVERSE CURRENT DETECTION

(75) Inventor: Junji Nishida, Neyagawa (JP)

(73) Assignee: Ricoh Company, Ltd., Tokyo (JP)

( * ) Notice: Subject to any disclaimer, the term of this patent is extended or adjusted under 35 U.S.C. 154(b) by 654 days.

(21) Appl. No.: 12/034,377

(22) Filed: Feb. 20, 2008

(65) Prior Publication Data

US 2008/0203990 A1    Aug. 28, 2008

(30) Foreign Application Priority Data

Feb. 22, 2007   (JP) ................................. 2007-042373

(51) Int. Cl.
  *G05F 1/00*   (2006.01)
(52) U.S. Cl. ...................................................... 323/284
(58) Field of Classification Search .................. 323/282, 323/284, 285, 351
  See application file for complete search history.

(56) References Cited

U.S. PATENT DOCUMENTS

| | | | | |
|---|---|---|---|---|
| 7,466,037 B2 * | 12/2008 | Takeshita et al. | ............... | 307/52 |
| 7,498,791 B2 * | 3/2009 | Chen | ............... | 323/284 |
| 7,548,050 B2 * | 6/2009 | Shirai et al. | ............... | 323/285 |
| 2006/0113980 A1 * | 6/2006 | Yoshida | ............... | 323/282 |
| 2006/0164057 A1 * | 7/2006 | Kudo et al. | ............... | 323/282 |
| 2006/0176035 A1 * | 8/2006 | Flatness et al. | ............... | 323/282 |
| 2006/0208717 A1 * | 9/2006 | Shimizu et al. | ............... | 323/284 |
| 2007/0075697 A1 * | 4/2007 | Shimizu et al. | ............... | 323/282 |
| 2007/0176588 A1 | 8/2007 | Nishida | | |
| 2007/0216389 A1 | 9/2007 | Nishida | | |
| 2007/0236971 A1 * | 10/2007 | Chen | ............... | 363/56.01 |
| 2007/0257651 A1 * | 11/2007 | Wrathall | ............... | 323/284 |

FOREIGN PATENT DOCUMENTS

| | | |
|---|---|---|
| JP | 2006-14482 | 1/2006 |
| JP | 2006-60977 | 3/2006 |
| JP | 2006-313392 | 11/2006 |

* cited by examiner

*Primary Examiner* — Adolf Berhane
*Assistant Examiner* — Jeffrey Gblende
(74) *Attorney, Agent, or Firm* — Dickstein Shapiro LLP

(57) ABSTRACT

A switching regulator that includes an inductor, a first step-down switch to store charge in the inductor, a second step-down switch to discharge the charge, a first step-up switch to store charge in the inductor, a second step-up switch to discharge the charge, a reverse current detector to detect a reverse current from an output terminal to the inductor through the second step-up switch, or an indication of the reverse current, based on a detection voltage, and a controller to control the first and second step-down switches, and the first and second step-up switches to output a predetermined constant voltage, and to shut off the second step-up switch to make shutdown condition when the detector detects the reverse current or an indication of the reverse current. The reverse current detector may have a threshold value in the step-down operation that is different from a threshold value in the step-up operation.

7 Claims, 3 Drawing Sheets

SWITCHING REGULATOR WITH REVERSE CURRENT DETECTION

This patent application claims priority to Japanese Patent Application No. 2007-042373 filed on Feb. 22, 2007 in the Japan Patent Office, the entire contents of which are incorporated by reference herein.

FIELD

This patent specification describes a switching regulator, and more particularly, a switching regulator capable of preventing a reverse current efficiently.

BACKGROUND

Recently, energy-saving has been actively promoted to protect the environment. For battery-powered portable equipment, such as mobile phones, digital cameras, and the like, energy efficiency is especially important to prolong battery life. Such portable equipment widely uses a step-down type switching regulator that includes an inductor because it is efficient and can be made compact.

A known synchronous rectification type switching regulator generally includes a switching transistor and a synchronous rectification transistor, and operates in a continuity mode and a discontinuity mode. In the continuity mode, a current flows through the inductor continuously. By contrast, in the discontinuity mode, the current does not flow through the inductor continuously. Consequently, when the switching regulator operates in the discontinuity mode with a light load condition, a reverse current may flow from an output terminal to the inductor. As a result, the performance efficiency of the switching regulator decreases.

In the known switching regulator, when the reverse current occurs, the synchronous rectification transistor is shut off to create a shutdown state, thus preventing the reverse current. However, the switching regulator generally employs a current detection resistor to detect the reverse current, and consequently power efficiency decreases due to power loss at the resistor.

FIG. 1 illustrates a known step-down switching regulator that includes a reverse current detection function. In FIG. 1, the switching transistor includes a switching transistor Q101, a synchronous rectification transistor Q102, a comparator 123, and an inductor L101. The comparator 123 compares a voltage at a connection node of the switching transistor Q101 and the synchronous rectification transistor Q102 with a reference voltage $V_{ref}$. When the switching transistor Q101 turns off, the synchronous rectification transistor Q102 turns on, during which condition a current is kept flowing through the inductor L101 because of energy that is stored in the inductor L101 while the switching transistor Q101 is on. A drain voltage of the synchronous rectification transistor Q102 drops to a negative voltage, that is, the current is kept flowing to an output terminal through the synchronous rectification transistor Q102 and the inductor L101. The energy stored in the inductor L101 decreases due to discharge of the charge stored in the inductor L101. Accordingly, the current flowing through the inductor L101 decreases.

When all the energy stored in the inductor L101 has been discharged while the switching transistor Q101 is off, the current flowing through the inductor L101 drops to zero and ultimately a reverse current begins to flow from the output terminal to the inductor L101. The drain voltage of the synchronous rectification transistor Q102 becomes a positive voltage. When the drain voltage of the synchronous rectification transistor Q102 exceeds the reference voltage $V_{ref}$, an output signal of the comparator 123 is inverted to a high level. The output signal with the high level changes a gate voltage of the synchronous rectification transistor Q102 to a low level through a NAND circuit 124, shutting off the synchronous rectification transistor Q102. Accordingly, occurrence of the reverse current is then prevented.

In the known switching circuit, the reference voltage $V_{ref}$ is determined to have a temperature dependence so as to cancel temperature characteristics of on-resistance of the synchronous rectification transistor Q102. However, the synchronous rectification transistor Q102 is shut off after the reverse current flows. Accordingly, the power loss cannot be made zero and the performance efficiency of the switching regulator decreases as a result.

Another step-down/step-up switching circuit is proposed as shown in FIG. 2. The switching circuit 100 includes switching transistors SW101 and SW103 and synchronous rectification transistors SW102 and SW104 for step-down and step-up operations, respectively. Depending on an input voltage $V_{in}$, the switching circuit 100 performs the step-down operation or the step-up operation. However, it is not possible to prevent occurrence of a reverse current in the step-up operation if a voltage of the synchronous rectification transistor SW102 for the step-down operation is checked in the same way as is done in the switching circuit shown in FIG. 1.

The inductor current flowing through the inductor L101 is checked when the switching transistors SW101 and SW103 are both off. Variation of the inductor current $\Delta iL$ is now described.

$\Delta iL = V_{out}/L$, in the step-down and step-down/step-up operations, and $\Delta iL = (V_{out} - V_{in})/L$ in the step-up operation, where L is an inductance of the inductor L101.

In the step-down operation, under a condition in which the switching transistor SW103 for step-up operation is off and the synchronous rectification transistor SW104 for step-up operation is on, the switching transistor SW101 and the synchronous rectification transistor SW102 for the step-down operation are switched on/off complementarily. In the step-up operation, under a condition in which the switching transistor SW101 for step-down operation is on and the synchronous rectification transistor SW102 for step-down operation is off, the switching transistor SW103 for the step-up operation is switched on/off complementarily to the synchronous rectification transistor SW104 for the step-up operation.

By contrast, in the step-up/step-down operation, the switching transistor SW101 for step-down operation and the switching transistor SW103 for step-up operation are turned on/off simultaneously. Further, the synchronous rectification transistor SW102 for the step-up operation and the synchronous rectification transistor SW104 for the step-up operation are turned on/off simultaneously. Furthermore, the switching transistor SW101 for the step-down operation and the switching transistor SW103 for the step-up operation are turned on/off complementarily to the synchronous rectification transistor SW102 for the step-down operation and the synchronous rectification transistor SW104 for the step-up operation.

Accordingly, in the step-down and step-down/step-up operations, the variation of the inductor current through the inductor L101 $\Delta iL$ is a fixed value if the output voltage $V_{out}$ is constant. Further, the value of the inductor current variation $\Delta iL$ is different from the inductor current variation in the step-up operation. Further, it is found that the variation of the inductor current $\Delta iL$ in the step-up operation depends on the input voltage $V_{in}$. However, deviation of the input voltage $V_{in}$ is not considered in the known switching regulator, when the reference voltage applied to the comparator for detecting the reverse current is determined. Consequently, an appropriate reference voltage is not determined for the step-up operation. As a result, a reverse current may occur and the performance efficiency of the switching regulator may decrease.

SUMMARY

This patent specification describes a novel switching regulator that includes an inductor, a first step-down switch to store charge in the inductor, a second step-down switch to discharge the charge, a first step-up switch to store charge in the inductor, a second step-up switch to discharge the charge, a reverse current detector to detect a reverse current from an output terminal to the inductor through the second step-up switch or an indication of the reverse current based on a detection voltage, and a controller to control the first and second step-down switches to output a predetermined constant voltage and to shut off the second step-up switch to shut down the switching regulator when the detector detects the reverse current or an indication of the reverse current. The reverse current detector may have different threshold values in the step-down operation and the step-up operation.

This patent specification further describes a novel switching regulator that includes an input circuit configured to output a signal by changing a voltage at an inductor-side terminal of the second step-up transistor in accordance with the input voltage when the controller performs a step-up operation, and a comparator configured to compare a voltage at a terminal of the output terminal side of the second step-up transistor with the signal output from the input circuit and output a signal indicating a comparison result.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
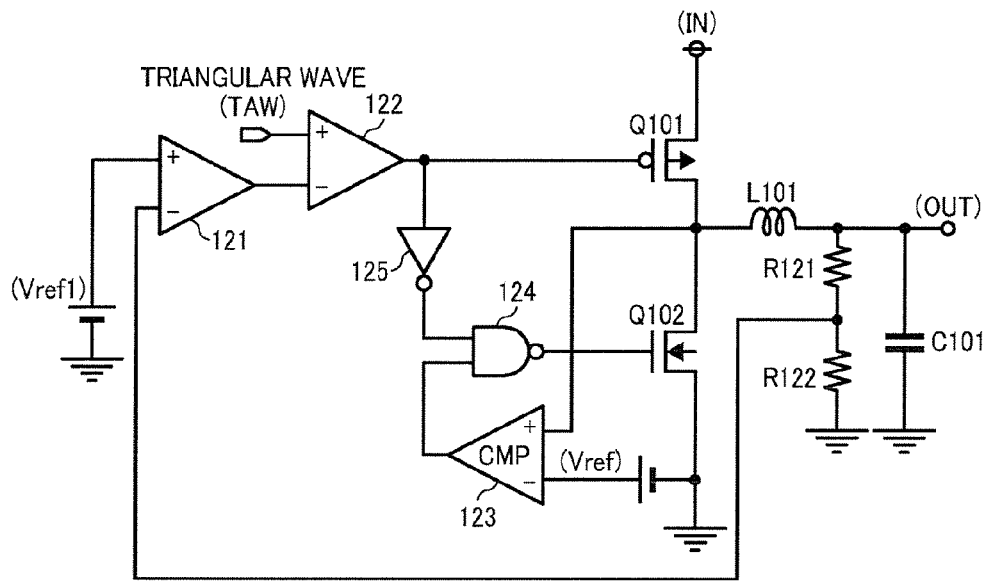
FIG. 1 illustrates a known step-down switching regulator that includes a reverse current detection function.
Figure 2:
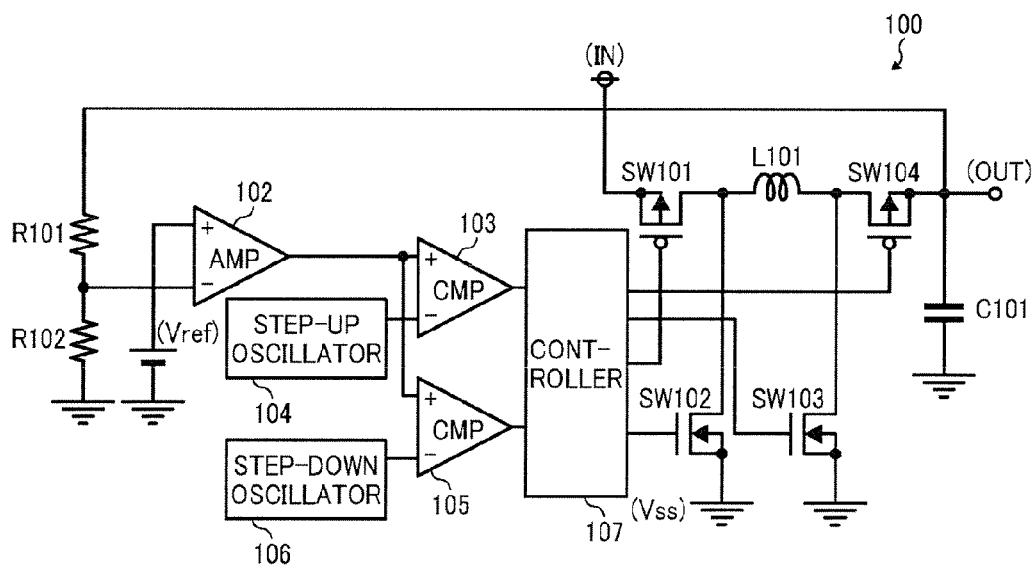
FIG. 2 illustrates another known step-down/step-up switching regulator.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views, switching regulators according to example embodiments are described.

Figure 3:
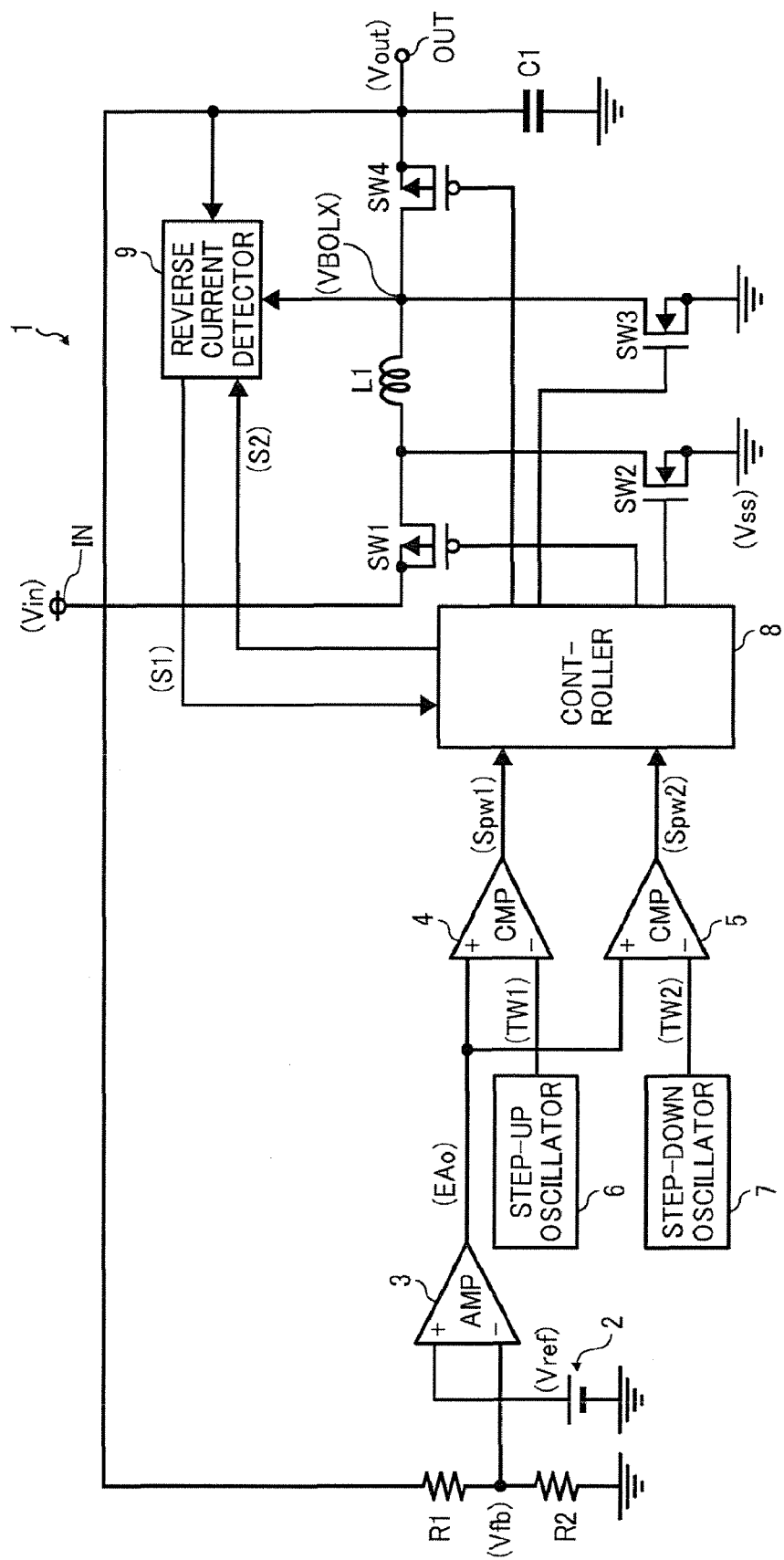
FIG. 3 illustrates a switching regulator according to an example embodiment of the disclosure.

FIG. 3 illustrates a switching regulator 1 according to an example embodiment of the disclosure. The switching regulator 1 performs either a step-up operation or a step-down operation. An input voltage $V_{in}$ input at an input voltage terminal IN is converted to a predetermined voltage in the step-down operation or the step-up operation. The converted voltage is output from an output terminal OUT. The predetermined voltage is higher than the input voltage $V_{in}$ in the step-up operation, and is lower than the input voltage $V_{in}$ in the step-down operation.

The switching regulator 1 includes an inductor L1, a first step-down switching transistor SW1, a second step-down switching transistor SW2, a first step-up switching transistor SW3 and a second step-up switching transistor SW4. The first step-down switch SW1 is a PMOS (p-channel metal-oxide silicon) transistor and performs switching to store charge in the inductor L1 based on an input voltage $V_{in}$, in accordance with a control signal input at a step-down operation. The second step-down switch SW2 is a NMOS (N-channel metal-oxide silicon) transistor and performs switching to discharge the charge stored in the inductor L1 in accordance with the control signal in the step-down operation. The second step-down switch SW2 works as a synchronous rectifier.

Similarly, the first step-up switch SW3 is a NMOS transistor and performs switching to store charge in the inductor L1 based on an input voltage Vin, in accordance with a control signal input at a step-up operation. The second step-up switch SW4 is a PMOS transistor and performs switching to discharge the charge stored in the inductor L1 in accordance with the control signal in the step-up operation.

Further, the switching regulator 1 includes resistors R1 and R2, an output capacitor C1, a reference voltage generator 2, an error amplifier 3, a step-up PWM (pulse width modulation) comparator 4, a step-down PWM comparator 5, a step-up oscillator 6, a step-down oscillator 7, a controller 8 and a reverse current detector 9. The resistors R1 and R2 generate a divided voltage $V_{fb}$ by dividing an output voltage $V_{out}$, and the reference voltage generator 2 generates a predetermined reference voltage $V_{ref}$. The step-up oscillator 6 generates and outputs a triangular wave signal TW1 for the step-up operation and the step-down oscillator 7 generates and outputs a triangular wave signal TW2 for the step-down operation.

The first step-down switch SW1 forms a step-down switching element, the second step-down switch SW2 forms a step-down synchronous rectifier switching element, the first step-up switch SW3 forms a step-up switching element, the second step-up switch SW4 forms a step-up synchronous rectifier switching element, and the reverse current detector 9 forms a reverse current detection circuit. Further, the reference voltage generator 2, the error amplifier 3, the step-up PWM comparator 4, the step-down PWM comparator 5, the step-up oscillator 6, the step-down oscillator 7, the controller 8, and the resistors R1 and R2 form a control circuit.

The first and second step-down switches SW1 and SW2 are connected in series between the input voltage terminal IN and ground. A ground voltage is indicated as Vss. The inductor L1 and the second step-up switch SW4 are connected in series between a connection node of the first and second step-down switches SW1 and SW2 and the output terminal OUT. The first step-up switch SW3 is connected between a connection node of the inductor L1 and the second step-up switch SW4, and ground. The output capacitor C1 is connected in parallel with the resistors R1 and R2 between the output terminal OUT and ground. The divided voltage $V_{fb}$ is output from a connection node of the resistors R1 and R2.

In the error amplifier 3, the divided voltage $V_{fb}$ is input to an inverted input terminal and the reference voltage $V_{ref}$ is input to a non-inverted input terminal. The error amplifier 3 amplifies a voltage difference between the divided voltage $V_{fb}$ and the reference voltage $V_{ref}$ and generates an output signal EAo.

The output signal EAo from the error amplifier 3 is input to a non-inverted input terminal and the triangular wave signal TW1 for the step-up operation is input to an inverted input terminal. The step-up PWM comparator 4 generates and outputs a pulse signal Spw1 based on the output signal EAo from the error amplifier 3 and the triangular wave signal TW1.

In the step-down PWM comparator 5, the output signal EAo from the error amplifier 3 is input to a non-inverted input terminal and the triangular wave signal TW2 for the step-down operation is input to an inverted input terminal. The step-down PWM comparator 5 generates and outputs a pulse signal Spw2 based on the output signal EAo from the error amplifier 3 and the triangular wave signal TW2.

A voltage across the second step-up switch SW4 is input to the reverse current detector 9. The reverse current detector 9 outputs a reverse current detection signal S1 that indicates whether a reverse current is detected or not based on the voltage across the second step-up switch SW4.

The pulse signals Spw1 and Spw2 and the reverse current detection signal S1 are input to the controller 8. Based on the pulse signals Spw1 and Spw2 and the reverse current detection signal S1, the controller 8 determines an operation mode to be performed from among the step-up, the step-up/step-down, and the step-down operations. The controller 8 outputs a switching signal S2 to the reverse current detector 9. Thus, the switching signal S2 indicates the operation mode determined by the controller 8. The controller 8 switches on/off the switching transistors, that is, the first step-up switch SW1, the second step-up switch SW2, the first step-down switch SW3 and the second step-down switch SW4.

More specifically, in the step-down operation, the first step-up switch SW3 is switched off and the first step-down switch SW1 and the second step-down switch SW2 are made to turn on/off complementarily under a condition in which the second step-up switch SW4 is on. In the step-up operation, the first step-down switch SW1 is switched on and the first step-up switch SW3 and the second step-up switch SW4 are made to turn on/off complementarily under a condition in which the second step-down switch SW2 is off.

In the step-up/step-down operation, the first step-down switch SW1 and the first step-up switch SW3 are switched on/off simultaneously, and the second step-down switch SW2 and the second step-down switch SW4 are switched on/off simultaneously. Further, the first step-down switch SW1 and the first step-up switch SW3 are switched on/off complementarily to the second step-down switch SW2 and the second step-down switch SW4.

The output voltage $V_{out}$ and a voltage $V_{BOLX}$, which are voltages at both ends of the second step-up switch SW4, are input to the reverse current detector 9. The reverse current detector 9 compares a voltage difference between the output voltage $V_{out}$ and the voltage $V_{BOLX}$ with the reference voltage $V_{ref}$ generated in the reverse current detector 9. The reverse current detector 9 outputs a predetermined reverse current detection signal S1 to the controller 8 when the voltage difference becomes smaller than the reference voltage $V_{ref}$. When the controller 8 receives the predetermined reverse current detection signal S1, the controller 8 switches the second step-up switch SW4 off and puts it in a shutdown state so that the reverse current is avoided. In this case, the reference voltage $V_{ref}$ is the threshold voltage for detection.

In the step-down operation, the controller 8 may switch the second step-down switch SW2 off and puts it in a shutdown state when the predetermined reverse current detection signal S1 is input. Further, the reverse current detector 9 may change the reference voltage $V_{ref}$ in accordance with the switching signal S2 output from the controller 8.

Figure 4:
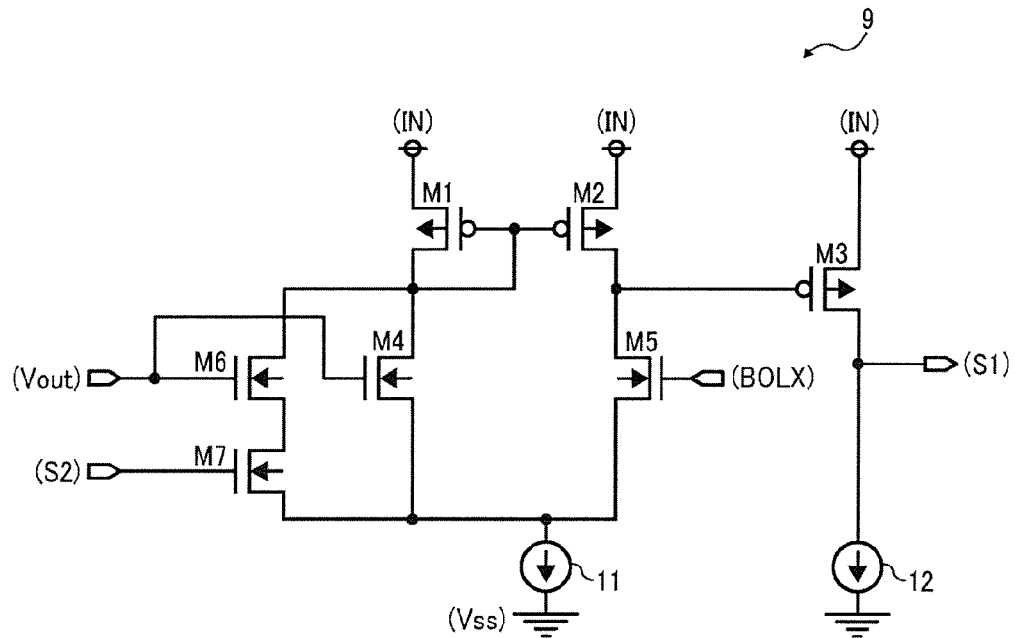
FIG. 4 illustrates an example circuit of the reverse current detector of FIG. 3.

FIG. 4 illustrates an example circuit of the reverse current detector 9 of FIG. 3. As shown in FIG. 4, the reverse current detector 9 is a comparator that includes PMOS transistors M1, M2, and M3, NMOS transistors M4, M5, M6, and M7, and constant current sources I1 and I2. The NMOS transistors M4 and M5 form input transistors of the comparator. The output voltage $V_{out}$ is input to a gate of the NMOS transistors M4 and the voltage $V_{BOLX}$ is input to a gate of the NMOS transistors M5. Each source of the PMOS transistors M1 and M2 is connected to the input voltage terminal IN. Each gate of the PMOS transistors M1 and M2 is commonly connected and a connection node of the gates is wired to a drain of the PMOS transistor M1 so as to form a current mirror circuit. The drain of the PMOS transistor M1 is connected to a drain of the NMOS transistor M4 and a drain of the PMOS transistor M2 is connected to a drain of the NMOS transistor M5. Each source of the NMOS transistors M4 and M5 is commonly connected and the current source I1 is connected between a connection node of the sources and ground.

A series circuit consisting of the NMOS transistors M6 and M7 is connected in parallel with the NMOS transistors M4. The output voltage $V_{out}$ is input to a gate of the NMOS transistor M6 and the switching signal S2 is input to a gate of the NMOS transistor M7. The PMOS transistor M3 and the current source T2 are connected in series between the input voltage terminal IN and ground. A gate of the PMOS transistor M3 is connected to a connection node of the PMOS transistor M2 and the NMOS transistor M5. The reverse current detection signal S1 is output from a connection node of the PMOS transistor M3 and the current source I2.

Since the NMOS transistors M4 and M5 have different characteristics, when a drain current of the NMOS transistors M4 is equal to a drain current of the NMOS transistors M5, the NMOS transistors M4 and M5 are formed by adjusting transistor dimensions such as transistor sizes, or, W(gate width)/L(gate length), etc. so that a voltage between a gate voltage and source voltage of the NMOS transistors M4 becomes smaller than a voltage between a gate voltage and source voltage of the NMOS transistor M5, for example. As a result, an input offset voltage is generated at the comparator that comprises the reverse current detector 9. The input offset voltage is determined to be equal to the reference voltage.

When the switching signal S2 is low, the NMOS transistor M7 is off and in a shutdown state. Accordingly, the NMOS transistor M6 does not affect the characteristics of the comparator that comprise the reverse current detector 9. However, when the switching signal S2 is high, the NMOS transistor M7 is on and closed. The NMOS transistor M6 is connected in parallel with the NMOS transistor M4, which is equivalent to increasing the size of the NMOS transistor M4. Accordingly, result similar to a case in which a voltage across the gate and source of the NMOS transistors M4 becomes smaller is obtained. As a result, the input offset voltage of the comparator that comprises the reverse current detector 9 increases. Hereinafter, the input offset voltage is referred to as a reference voltage Vr1 when the switching signal S2 is low, and the input offset voltage is referred to as a reference voltage Vr2 when the switching signal S2 is high.

When the switching signal S2 is low, sufficient energy is stored in the inductor L1, and the voltage difference between both terminals of the second step-up transistor SW4 is higher than the reference voltage Vr1, the reverse current detection signal S1 that is an output signal of the comparator is high. However, when a current from the inductor L1 decreases, and the voltage difference between both terminals of the second step-up transistor SW4 falls below the reference voltage Vr1, the reverse current detection signal S1 becomes low. When the reverse current detection signal S1 is low, the controller 8 switches the second step-up switch SW4 off.

Thus, the second step-up switch SW4 is shut off and in a shutdown state before an occurrence of the reverse current.

By contrast, in the known circuitry, the reverse current is stopped only after the occurrence of the reverse current as previously described.

Accordingly, it is found that a loss due to the reverse current can be prevented perfectly, and the performance efficiency of the circuit improves according to the example embodiment.

Furthermore, when the switching signal S2 becomes high, the input offset voltage of the comparator that comprises the reverse current detector 9 is the larger value that is the reference voltage Vr2. It is possible to determine a detection voltage based on a large voltage difference between both terminals of the second step-up transistor SW4 according to the example embodiment.

The reference voltages Vr1 and Vr2 are determined so that the current becomes zero ampere or nearly zero ampere within a time period which is a summation of a delay time of the comparator, and a delay time from a time the output signal of the comparator changes to a time the second step-up transistor SW4 is turned off by the controller 8. From another point of view, the reference voltages Vr1 and Vr2 are determined so that the voltage difference between both terminals of the second step-up transistor SW4 becomes zero volts or nearly zero volts within a time period which is a summation of a delay time of the comparator, and a delay time from a time the output signal of the comparator changes to a time the second step-up transistor SW4 is turned off by the controller 8. As a result, the energy stored in the inductor L1 can be used fully and the loss due to the reverse current can be avoided.

Changes in the amount of current flowing from the inductor L1 are checked when the first step-down switching transistor SW1 is off in the step-down operation and when the first step-up switching transistor SW3 is off in the step-up operation, respectively. When the amount of change in the current is small, the controller 8 makes the switching signal S2 low so that the reference voltage Vr1 is used. The reference voltage Vr1 is the smaller input offset voltage for the reverse current detector 9.

When the amount of change in the current is large, the controller 8 makes the switching signal S2 high so that the reference voltage Vr2 is used. The reference voltage Vr2 is the larger input offset voltage for the reverse current detector 9.

As a result, the reverse current can be avoided both in the step-down and the step-up operations, and the energy stored in the inductor L1 can be used fully.

Figure 5:
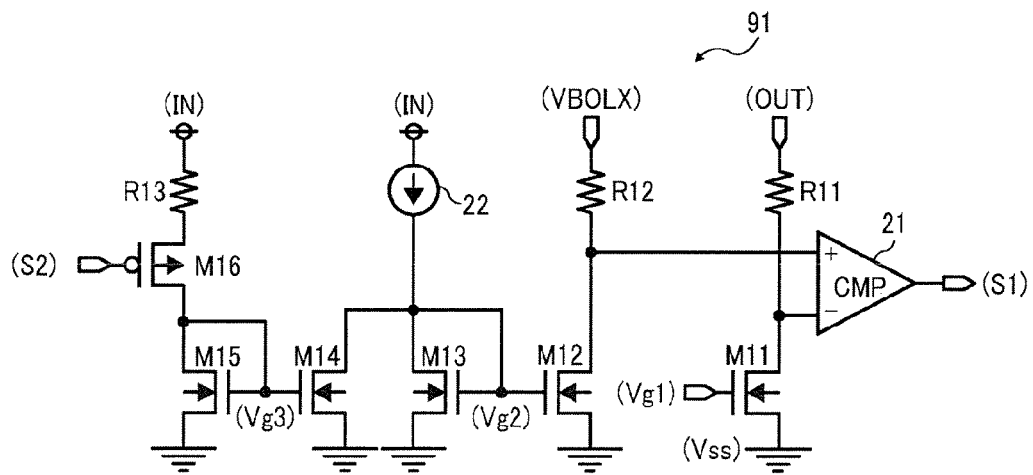
FIG. 5 illustrates another example circuit of the reverse current detector of FIG. 3.

FIG. 5 illustrates another example circuit of the reverse current detector 91 of FIG. 3. In FIG. 5, the reverse current detector 91 includes NMOS transistors M11, M12, M13, M14, and M15, PMOS transistor M16, resistors R11, R12, and R13, a comparator 21, and a constant current source 22. The resistors R11 and R12, the NMOS transistors M11, M12, M13, M14, and M15, the PMOS transistor M16, and the constant current source 22 form an input circuit. No input offset voltage is set at the comparator 21 in this example circuit.

Each source of the NMOS transistors M14 and M15 is connected to ground. Each gate of the PMOS transistors M14 and M15 is commonly connected and a connection node of the gates is wired to a drain of the NMOS transistor M15 so as to form a current mirror circuit. The resistor R13 and the PMOS transistors M16 are connected in series between the input voltage terminal IN and the NMOS transistor M15. The switching signal S2 is input to a gate of the PMOS transistors M16.

Further, each source of the NMOS transistors M12 and M13 is connected to ground. Each gate of the PMOS transistors M12 and M13 is commonly connected and a connection node of the gates is wired to a drain of the NMOS transistor M13 so as to form a current mirror circuit. The current source 22 is connected between the input voltage terminal IN and the NMOS transistor M13. The drain of the NMOS transistor M13 is connected to a drain of the NMOS transistor M14. The resistor R12 is connected between a BOLX input terminal for receiving a BOLX signal and a drain of the NMOS transistor M12. A connection node of the resistor R12 and the NMOS transistors M12 is wired to a non-inverted input terminal of the comparator 21.

The resistor R11 and the NMOS transistors M11 are connected in series between the input voltage terminal IN and ground. A gate voltage Vg1 is input to a gate of the NMOS transistors M11 from outside of the reverse current detector 91. The reverse current detection signal S1 is output from an output terminal of the comparator 21. In FIG. 5, a voltage at connection node of the gates of the NMOS transistors M12 and M13 is referred to as Vg2 and a voltage at connection node of the gates of the NMOS transistors M14 and M15 is referred to as Vg3.

When the switching signal S2 is high, the PMOS transistors M16 is off and in a shutdown state so that there is no drain current of the NMOS transistors M15. As a result, there is no drain current of the NMOS transistors M14. Therefore, a drain current of the NMOS transistor M13 represents the entire current from the constant current source 22. Since the NMOS transistors M12 and M13 form a current mirror circuit, a drain current of the NMOS transistor M12 is proportional to the current from the constant current source 22.

An input voltage input to a non-inverted input terminal of the comparator 21 is a voltage obtained by subtracting a voltage drop at the resistor R12 from a voltage $V_{BOLX}$ at the input terminal BOLX. An input voltage input to an inverted input terminal of the comparator 21 is a voltage obtained by subtracting a voltage drop at the resistor R11 from the output voltage $V_{OUT}$ at the output terminal OUT. The voltage drop at the resistor R12 is determined as a product of the drain current of the NMOS transistor M12 and a resistance of the resistor R12. Similarly, the voltage drop at the resistor R11 is determined as a product of the drain current of the NMOS transistor M11 and a resistance of the resistor R11. The drain current of the NMOS transistor M11 is determined by the gate voltage Vg1. The voltage drop at the resistor R12 is determined to be larger than the voltage drop at the resistor R11. The voltage difference between the voltage drop at the resistor R11 and the voltage drop at the resistor R12 is determined to be the reference voltage in this example circuit of the reverse current detector 91.

As a result, when the current of the inductor L1 is large and the voltage difference at both terminals of the second step-up switch SW4 is larger than the reference voltage, the comparator 21 outputs the reverse current detection signal S1 at high. When the current of the inductor L1 decreases and the voltage difference at both terminals of the second step-up switch SW4 falls below the reference voltage, the reverse current detection signal S1 falls to low. When the reverse current detection signal S1 is low, the controller 8 switches the second step-up switch SW4 off and puts it in a shutdown state.

When the switching signal S2 is low, the PMOS transistors M16 is on and closed. Then, the drain current of the NMOS transistor M15 becomes a current obtained by dividing a voltage difference between the input voltage $V_{in}$ and the gate voltage of the NMOS transistor M15 by a resistance of the resistor R13. Accordingly, the drain current of the NMOS transistor M15 changes in accordance with the input voltage $V_{in}$. Namely, when the input voltage $V_{in}$ is large, the drain current of the NMOS transistor M15 is large. Since the NMOS transistor M14 forms a current mirror circuit with the NMOS transistor M15, the drain current of the NMOS transistor M14 also changes in accordance with the input voltage $V_{in}$.

The drain current of the NMOS transistor M13 decreases by an amount equal to the drain current of the NMOS transistor M14. Accordingly, the drain current of the NMOS transistor M12 decreases because the NMOS transistor M12 forms a current mirror circuit with the NMOS transistor M13. Thus, the voltage drop at the resistor R12 becomes smaller than the voltage drop when the switching signal S2 is high. Further, the voltage drop at the resistor R12 changes in accordance with the input voltage $V_{in}$. Namely, the voltage drop at the resistor R12 decreases when the input voltage $V_{in}$ is large, and increases when the input voltage $V_{in}$ is small.

As described above, during the step-down operation, the controller 8 makes the switching signal S2 high to cause the reverse current detector 91 to generate a reference voltage with a fixed voltage. During the step-up operation, the controller 8 makes the switching signal S2 low to cause the reverse current detector 91 to generate a reference voltage that changes in accordance with the input voltage $V_{in}$. Consequently, the reverse current is avoided before it occurs even if the input voltage $V_{in}$ is changed. Further, the energy stored in the inductor L1 can be used efficiently without waste.

In the embodiment described above, the reference voltage in the step-up operation is smaller than the reference voltage in the step-down operation. However, the circuitry may be changed so that the reference voltage in the step-up operation is larger than the reference voltage in the step-down operation. Further, the circuitry may be changed so that the reference voltage in the step-down operation is a voltage within a range of the reference voltage in the step-up operation.

In the embodiment described above, the second step-up switch SW4 is turned off to avoid the reverse current. However, during the step-down operation, the second step-down switch SW2 is turned off. When the second step-up switch SW4 is off during the step-up operation, the voltage $V_{BOLX}$ is nearly ground volt. Accordingly, the voltage difference detected by the reverse current detector 91 is below the reference voltage and a predetermined reverse current detection signal S1 is output from the reverse current detector 91. However, the controller 8 ignores the reverse current detection signal S1 when the second step-up switch SW4 is off.

Thus, in the step-up and step-down switching regulator, the reverse current detector 91 compares a voltage difference between the output voltage $V_{out}$ and the voltage $V_{BOLX}$ with the reference voltage $V_{ref}$ generated in the reverse current detector 91. When the voltage difference is below the reference voltage, a predetermined reverse current detection signal S1 is output to the controller 8. Then, the comparator 8 shuts the second step-up switch SW4 off and puts it in a shutdown state so as to avoid the occurrence of the reverse current. Accordingly, the reverse current can be avoided in each of the step-down, the step-up, and the step-up/step-down operations.

In the embodiments described above, the switching regulator operates the step-down, the step-up, and the step-up/step-down operations. However, the concept of this disclosure is equally applicable to switching regulators that perform the step-down operation and/or the step-up operation.

Numerous additional modifications and variations of the present disclosure are possible in light of the above teachings. It is therefore to be understood that, within the scope of the appended claims, the disclosure of this patent specification may be practiced otherwise than as specifically described herein.

What is claimed is:

1. A switching regulator, comprising:
   an inductor configured to store charge from an input voltage terminal;
   a first step-down switch configured to switch to store a charge in the inductor at a step-down operation in accordance with a first control signal;
   a second step-down switch configured to discharge the charge stored in the inductor in the step-down operation in accordance with a second control signal;
   a first step-up switch configured to switch to store a charge in the inductor at a step-up operation in accordance with a third control signal;
   a second step-up switch configured to discharge the charge stored in the inductor in the step-up operation in accordance with a fourth control signal;
   a reverse current detector configured to detect a reverse current from an output terminal to the inductor through the second step-up switch; and
   a controller configured to control the first and second step-down switches and the first and second step-up switches to output a predetermined constant voltage at an output terminal, and to shut off the second step-up switch when the detector detects the reverse current or an indication of the reverse current,
   wherein the reverse current detector has a threshold value in the step-down operation for determining an occurrence of the reverse current or an indication of the reverse current and a threshold value in the step-up operation for determining an occurrence of the reverse current or an indication of the reverse current,
   wherein the reverse current detector comprises a comparator that checks the voltage difference between both terminals of the second step-up transistor and changes an input offset voltage in accordance with an operation mode of the comparator,
   and wherein the threshold value in step-up and step-down operations is determined to be the input offset voltage.

2. The switching regulator of claim 1, wherein the threshold value in the step-down operation for determining an occurrence of the reverse current or an indication of the reverse current and in the step-up operation for determining an occurrence of the reverse current or an indication of the reverse current are different values.

3. The switching regulator of claim 1, wherein the controller switches the first step-down switch and the first step-up switch on/off simultaneously, switches the second step-down switch and the second step-up switch simultaneously, and switches the first step-down switch and the first step-up switch on/off complementarily to the second step-down switch and the second step-up switch, and
   wherein the reverse current detector determines a threshold value in the step-down/step-up operation equal to a threshold value in the step-down operation for determining an occurrence of the reverse current or an indication of the reverse current.

4. The switching regulator of claim 1, wherein the reverse current detector determines the detection voltage from a voltage difference between both terminals of the second step-up transistor which turns on to detect the reverse current or an indication of the reverse current.

5. The switching regulator of claim 4, wherein the reverse current detector determines an occurrence of the reverse current or an indication of the reverse current when the detection voltage falls below the threshold value, where a positive current direction is defined to be a current direction in which current flows from the inductor to the output terminal through the second step-up switch.

6. The switching regulator of claim 5, wherein a first delay time is determined to be within a second delay time,
   wherein the first delay time is defined to be a time period from a time the detection voltage falls below the threshold value to a time the reverse current detector detects the reverse current or an indication of the reverse current and the second step-up transistor is turned off by the controller,
   and wherein the second delay time is defined to be a time period from a time the detection voltage falls below the threshold value to a time the detection voltage reaches zero volts.

7. A switching regulator, comprising:
   an inductor configured to store charge from an input voltage terminal;
   a first step-down switch configured to switch to store a charge in the inductor at a step-down operation in accordance with a first control signal;
   a second step-down switch configured to discharge the charge stored in the inductor in the step-down operation in accordance with a second control signal;
   a first step-up switch configured to switch to store a charge in the inductor at a step-up operation in accordance with a third control signal;
   a second step-up switch configured to discharge the charge stored in the inductor in the step-up operation in accordance with a fourth control signal;
   a reverse current detector configured to detect a reverse current from an output terminal to the inductor through the second step-up switch; the reverse current detector comprising:
   a controller configured to control the first and second step-down switches and the first and second step-up switches to output a predetermined constant voltage at an output terminal, and to shut off the second step-up switch when the detector detects the reverse current or an indication of the reverse current;
   wherein the reverse current detector has a threshold value in the step-down operation for determining an occurrence of the reverse current or an indication of the reverse current and a threshold value in the step-up operation for determining an occurrence of the reverse current or an indication of the reverse current, and
   wherein the reverse current detector comprises:
      an input circuit configured to output a signal by changing a voltage at an inductor-side terminal of the second step-up transistor in accordance with the input voltage when the controller performs a step-up operation; and
      a comparator configured to compare a voltage at a terminal of the output terminal side of the second step-up transistor with the signal output from the input circuit, and output a signal indicating a comparison result.

* * * * *